US006496629B2

(12) United States Patent
Ma et al.

(10) Patent No.: US 6,496,629 B2
(45) Date of Patent: *Dec. 17, 2002

(54) UNDERSEA TELECOMMUNICATIONS CABLE

(75) Inventors: Chung Shin Ma, Morganville, NJ (US); Qian Zhong, Freehold, NJ (US)

(73) Assignee: TyCom (US) Inc., Morristown, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/410,578

(22) Filed: Oct. 1, 1999

(65) Prior Publication Data

US 2002/0044750 A1 Apr. 18, 2002

Related U.S. Application Data

(63) Continuation-in-part of application No. 09/378,081, filed on May 28, 1999.

(51) Int. Cl.⁷ ................................................ G02B 6/44
(52) U.S. Cl. ...................................................... 385/113
(58) Field of Search ........................... 385/100–113, 147

(56) References Cited

U.S. PATENT DOCUMENTS

| 4,156,104 A |   | 5/1979  | Mondello ............... 174/70 R |
|---|---|---|---|
| 4,278,883 A | * | 7/1981  | Jackson ................... 174/70 R |
| 4,370,023 A | * | 1/1983  | Vitands et al. ............ 385/100 |
| 4,420,220 A |   | 12/1983 | Dean et al. .............. 350/96.23 |
| 4,538,881 A |   | 9/1985  | Anctil et al. ............ 350/96.23 |
| 4,645,298 A |   | 2/1987  | Gartside, III ........... 350/96.23 |
| 4,693,551 A |   | 9/1987  | Blanco et al. .......... 350/96.23 |
| 4,765,711 A |   | 8/1988  | Obst ....................... 350/96.23 |

(List continued on next page.)

Primary Examiner—Akm E. Ullah

(57) ABSTRACT

An undersea telecommunications cable comprises a buffer tube which protects a plurality of optical fibers disposed therein from externally applied forces. To this end, the buffer tube contains a thixotropic, water blocking gel that has a viscosity and a critical yield shear stress sufficient to couple, upon application of a tensile load capable of producing up to a 0.8% strain in the cable, tensile forces from the buffer tube to the optical fibers to thereby induce strain in the fibers that is proportional to that induced in the tube, without preventing the return of the optical fibers to a substantially unstrained condition upon the removal of such tensile load. Should it become necessary to repair a section of the undersea cable as by retrieving it from the sea bed and inserting a spliced segment, existing sections of the fiber will be sufficiently protected from any damage which might otherwise have been caused during the cable retreival and recovery operation.

20 Claims, 7 Drawing Sheets

U.S. PATENT DOCUMENTS

| | | | |
|---|---|---|---|
| 4,767,182 A | * 8/1988 | Parfree et al. | 385/100 |
| 4,786,137 A | 11/1988 | Cornelison et al. | |
| 4,913,516 A | 4/1990 | Ikeda | 350/96.23 |
| 4,960,318 A | 10/1990 | Nilsson et al. | 350/96.23 |
| 5,015,063 A | 5/1991 | Panuska et al. | 350/96.23 |
| 5,029,974 A | 7/1991 | Nilsson | 350/96.23 |
| 5,050,957 A | 9/1991 | Hamilton et al. | 385/113 |
| 5,121,458 A | 6/1992 | Nilsson et al. | 385/100 |
| 5,125,062 A | 6/1992 | Marlier et al. | |
| 5,125,063 A | 6/1992 | Panuska et al. | 385/113 |
| 5,165,003 A | 11/1992 | Carter | 385/112 |
| 5,199,096 A | 3/1993 | Kathiresan et al. | 385/109 |
| 5,212,756 A | 5/1993 | Boll | 385/114 |
| 5,268,971 A | 12/1993 | Nilsson et al. | 385/101 |
| RE34,516 E | 1/1994 | Houghton | 385/103 |
| 5,329,606 A | 7/1994 | Andreassen | 385/109 |
| 5,334,421 A | 8/1994 | McNutt | 427/513 |
| 5,384,880 A | 1/1995 | Keller et al. | 385/109 |
| 5,505,773 A | 4/1996 | Vitands et al. | |
| 5,561,729 A | 10/1996 | Parris | 385/113 |
| 5,574,816 A | 11/1996 | Yang et al. | 385/109 |
| 5,577,150 A | 11/1996 | Holder et al. | 385/134 |
| 5,619,606 A | 4/1997 | Bonicel | 385/102 |
| 5,621,031 A | 4/1997 | Leimann et al. | 524/195 |
| 5,751,880 A | 5/1998 | Gaillard | 385/109 |
| 5,761,362 A | 6/1998 | Yang et al. | 385/109 |
| 6,041,153 A | 3/2000 | Yang | 385/109 |
| 6,088,499 A | 7/2000 | Newton et al. | 385/112 |

* cited by examiner

UNDERSEA TELECOMMUNICATIONS CABLE

REFERENCE TO RELATED APPLICATIONS

The present application is a continuation-in-part of patent application Ser. No. 09/378,081 now allowed entitled "Undersea Communications Cable Having Centrally Located, Plastic Buffer Tube" and filed on May 28, 1999.

BACKGROUND OF THE INVENTION

1. Field of the Invention

The present invention relates generally to optical fiber communications cables specifically designed for undersea use and, more particularly, to undersea communications cables in which one or more optical fibers are disposed within a centrally located buffer tube.

2. Discussion of the Background Art

Telecommunication systems employing optical fibers as the transmission medium have become widespread because of their wide bandwidth, relatively low optical loss, and the development of optical amplifiers that do not require conversion of the optical signal into the electrical domain for amplification. Certain operating environments, however, pose specific design challenges to those seeking to efficiently utilize the unique properties and advantages of optical fibers. Systems have been specifically designed, for example, to span trans-oceanic distances to accommodate the intercontinental exchange of voice and data traffic at rates approaching 10 gigabits/s over a single optical fiber. In addition to the development of highly sophisticated techniques for transmitting and receiving the optical signals representative of this high-volume traffic, the implementation of undersea telecommunication systems has further required advances in cable design to adequately protect the fibers over a system design life typically in excess of several decades.

In designing a cable suitable for undersea use, one should have an appreciation of the external environmental and operating factors having the potential to affect the transmission carrying ability of the fiber. For example, once a cable has been deployed at the floor of an ocean, it may be subjected to high hydrostatic pressure, low temperatures, as well as the corrosive effects of sea water. One must also take into consideration the possibility of damage to the cable as, for example, might be caused by ships weighing anchor in the area of the cable or conducting commercial fishing operations. In such event, the ingress of water might potentially damage up to several kilometers of fiber in the time it would take to send out a repair vessel to splice in a new section of cable. Moreover, during the cable recovery and repair process itself, the damaged undersea cable might be subjected bending stresses, as well as tensile loads approaching 13,000 to 18,000 pounds depending on the cable type and depth of the affected section. Finally, the design of the cable must be such that it is economically practical to manufacture, with a level of quality and reliability that is repeatable.

An undersea cable design which has met with a fair degree of commercial success is disclosed by Marlier et al. in U.S. Pat. No. 5,125,062 entitled UNDERSEA TELECOMMUNICATIONS CABLE HAVING OPTICAL FIBERS and issued on Jun. 23, 1992. The cable design disclosed by Marlier et al. comprises a centrally located buffer tube within which there is disposed a sealing gel and through which extend a plurality of optical fibers. Marlier et al. indicate that the buffer tube is intended to protect the fibers from the compressive effects of undersea deployment, and that it may be either made of steel or plastic. In the event of a plastic buffer tube, Marlier et al. propose that one or more layers of strength members may be helically wound around the buffer tube so as to enhance the structural integrity of the cable. An electrically conductive tube is swaged over these strength members to carry electricity from a remote source on land to such equipment as pump lasers which disposed in optical amplifier assemblies disposed at intervals along the cable lay. A polyethylene sheath surrounds the structure.

While the Marlier et al. design is relatively easy to manufacture, no attention is given in the patent disclosure to the behavior of the fiber when the cable is placed under tensile load, nor how or whether the fiber returns to a relaxed, i.e., unstressed state after such load is removed. Accordingly, no meaningful guidance is given to the selection of material properties and other design variables so as to achieve a design which is highly robust and reliable over the broad range of operating and environmental conditions, including those to which the cable might be subjected during repair, that might be encountered over the multiple decade design life typically demanded by purchasers of undersea telecommunications systems.

SUMMARY OF THE INVENTION

The aforementioned need is addressed and an advance is made in the art, by an undersea telecommunications cable which comprises a buffer tube to protect a plurality of optical fibers disposed therein from externally applied forces. To this end, the buffer tube contains a thixotropic, water blocking gel having a viscosity and a critical yield shear stress sufficient to provide coupling, upon application of a tensile load to the cable producing up to a 0.8% cable strain, of tensile forces from the buffer tube to the optical fibers so as to induce strain in the fibers proportional to the strain induced in the tube without preventing the return of the optical fibers to a substantially unstrained condition upon the removal of such tensile load. Accordingly, should it become necessary to repair a section of the undersea cable as by retrieving it from the sea bed and inserting a spliced segment, existing sections of the fiber will be sufficiently protected from any damage which might otherwise have been caused during the cable retreival and recovery operation.

As used herein, the phrase substantially unstrained condition is intended to refer to an average residual strain in the fiber in the range of from about −0.05 to about 0.10, the preferred value being as close to zero as possible. Since the amount of residual strain may not be uniformly distributed along the fiber, however, the condition may alternatively be defined by reference to the increase in attenuation or average loss in the fiber that is attributable to the residual strain therein. For a typical undersea telecommunication system, such average change in attenuation should be substantially close to zero as any appreciable increase, say above 0.002 to 0.005 dB/km may cause a substantial impairment to the overall system power budget.

DETAILED DESCRIPTION

Figure 1:
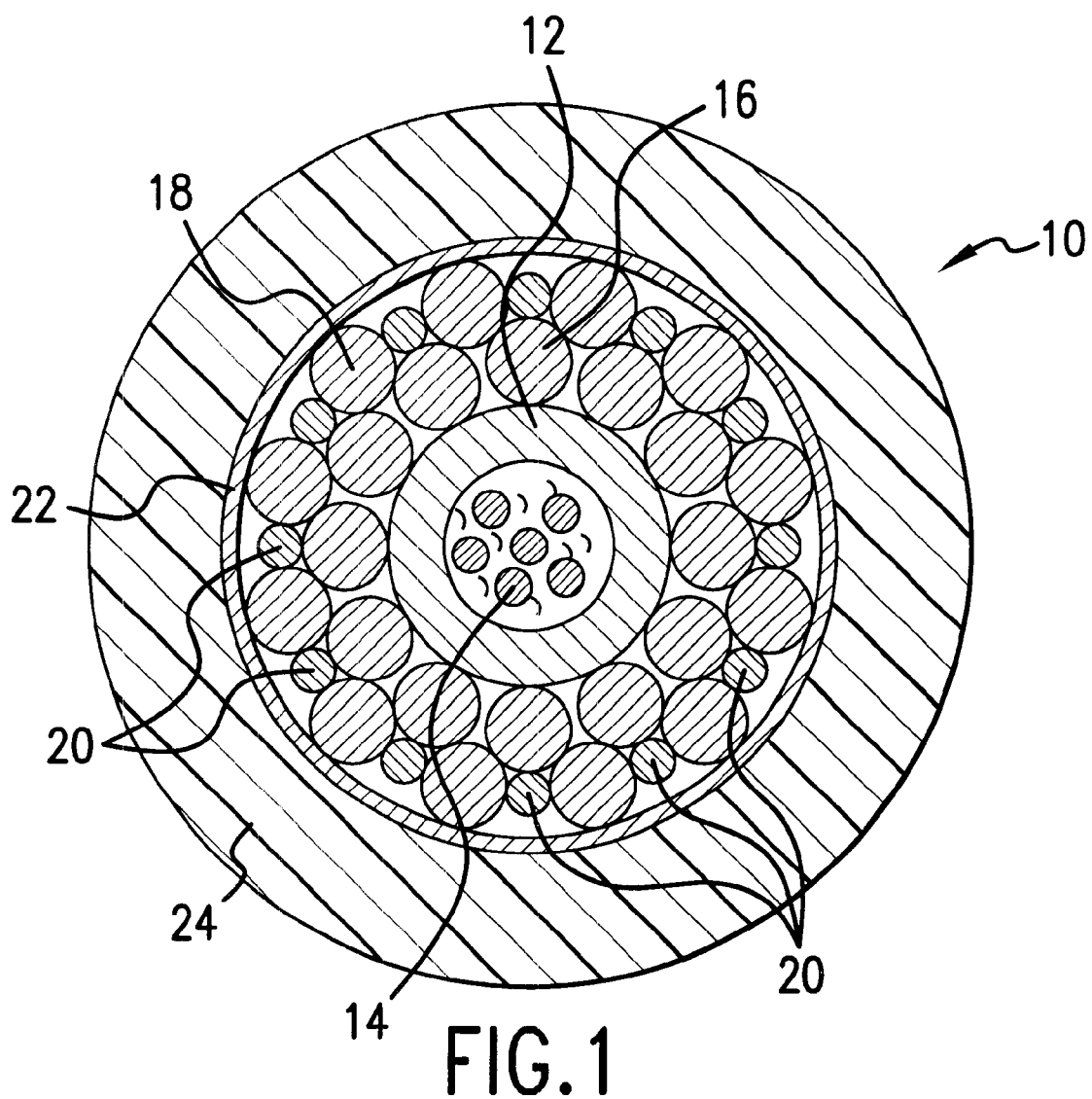
FIG. 1 is a cross-sectional view depicting an optical fiber cable constructed in accordance with the present invention for use in undersea applications.

With initial reference to FIG. 1, there is shown an illustrative embodiment of a cable adapted for use in an undersea optical fiber communication system and constructed in accordance with the teachings of the present invention. As seen in FIG. 1, the illustrative cable 10 includes a centrally located buffer tube 12 within which there are disposed a plurality of optical fibers 14. In accordance with a preferred embodiment of the present invention, the amount of excess fiber length in the cable should not exceed 0.1%, and in accordance with an especially preferred embodiment, the amount of excess fiber length should be between 0 and 0.05%. As used herein, the term excess fiber length is intended to refer to the average amount of slack in each fiber as a function of the corresponding length of cable within which that fiber is disposed.

Within the centrally located buffer tube 12, there is also disposed a water blocking, thixotropic gel. Gels of various material bases, including silicone and mineral oil, have been used within the buffer tubes of conventional cables. For cables constructed in accordance with the present invention, synthetic oil based materials that contain fumed silica are especially preferred because they do not adversely interact with a wide variety of optical fiber coatings and they do not generation appreciable amounts of deleterious hydrogen. As will be explained in greater detail later, applicants have further discovered that substantial benefits in terms of cable reliability and repairability may be advantageously realized by selecting a gel that satisfies several rheological criteria, and by choosing an appropriate amount of excess fiber length.

The buffer tube 12, in conjunction with the thixotropic gel disposed therein, is dimensioned and arranged to protect the optical fibers from a variety of external forces, including, for example, bending during the loading and deployment process, as well as water pressure. It may be made from a metal material, such for example, as steel longitudinally welded by laser, by arc-welding under an inert gas, or by any other suitable method. However, the use of such materials and the requisite welding techniques are quite expensive and the inventors herein favor a plastic material that can be extruded around the fibers during production of the cable. Plastic materials are preferred because they are relatively inexpensive and because they are already commonly used in the manufacture of terrestrial optical fiber cables. As such, commercially available equipment capable of applying an extruded layer of plastic material to a running length of gel coated optical fibers may be readily obtained. Moreover, the smoother surfaces characteristic of extruded plastic materials are believed by the inventors herein to enhance the force coupling ability of the gel.

For a particular plastic material to be used in the fabrication of a buffer tube suitable for undersea use, it must be capable of retaining—over the design life of the cable—its mechanical properties (i.e. tensile and yield strength and elasticity), its compatibility with the cable filling compound (sealing gel) and fiber coating material, its hydrolytic stability, and its resistance to creep and/or stress relaxation. Moreover, the material must be such that it does not become a source of hydrogen or any other gaseous effluent having a tendency to adversely interact with other components of the cable (i.e., the gel or fibers). One material that the inventors herein have found to be satisfactory is polybutylene therapthalate (PBT), an engineering thermoplastic that exhibits the desired mechanical properties, smoothness, and a generally good chemical stability. It is a semicrystalline material with a melting point of approximately 220° C. and a glass transition temperature ranging from 40 to 60° C.

The primary mechanism of degradation of PBT is through its susceptability to hydrolysis. The potential impact of PBT hydrolysis is two-fold: degradation of mechanical properties and concern for hydrogen generation. Fortunately, a great amount of investigative effort has already been expended in the hydrolytic stabilization of PBT, this effort being attributable to the desire to adapt PBT to the fabrication of non-undersea (terrestrial) cable applications where the concern relates to the effects of a high humidity environment. It is well established that tensile properties of PBT are not sufficiently sensitive to hydrolysis, while elongation at break is generally used as a parameter to quantify the reduction in impact and toughness properties. Although considered a rather severe condition for undersea applications, a commonly accepted criterion for hydrolytic stability is an elongation at break greater than or equal to 10% after 45-day aging at 85° C. and 85% relative humidity.

Although buffer tube 12 may be constructed of hydrolytically stabilized PBT, it should be emphasized here that other plastic materials chemically compatible with the other materials and having mechanical properties appropriately matched to the loading to which the cable may be subjected to during its service life may also be employed. By way of further illustrative example, such materials as polypropylene, a high density polyethylene, or a polyamide might also be used.

To enhance the ability of the plastic buffer tube 12 to withstand the extremes of hydrostatic pressure to which the cable 10 may be subjected upon deployment, which pressure may be in excess of 10,000 psi, cable 10 preferably includes one or more layers of strength members that surround the buffer tube 12. By way of illustrative example, these strength members may be configured in the form of steel wires helically wound about buffer tube 12. It should be readily appreciated by those skilled in the art, however, that the strength members need not have a circular-cross sectional profile and may be configured in any desired arrangement, so long as sufficient structural strength is obtained to protect the buffer tube 12 and its contents from the application of hydrostatic forces upon deployment in the environment for which cable 10 is designed.

With continued reference to FIG. 1 and the illustrative embodiment of the present invention depicted therein, it will be seen that the strength members are concentrically arranged in two distinct layers, the inner layer comprising steel wires 16 having a uniform, circular cross sectional profile and the outer layer comprising an alternating arrangement of steel wires 18 and 20 having respectively different, circular cross sectional profiles. In each layer, the quantity and cross sectional dimensions of the strength members 16, 18 and 20 are preferably selected so as to achieve, in each layer, a closely packed arrangement. To further resist the movement of water (as might occur in the event of a cable cut or other damage), the interstices between the strength members are impregnated with a sealing material (not shown for clarity of illustration).

The illustrative cable of FIG. 1 further includes an electrically conductive member 22 which surrounds the strength members and serves as both an electrical conductor and a hermetic barrier. By way of example, the conductive member may be formed from an elongated copper strip which is welded longitudinally to constitute a tube and swaged onto the helical lay of strength members. Advantageously, if this conductive member is constructed of copper, as is the case in the illustrative embodiment depicted in FIG. 1, it further serves to impede the diffusion of hydrogen through the plastic buffer tube 12. It should, however, be noted that the electrically conductive member may be omitted in the event it is not necessary or desirable supply electrical power at any point along the cable span, provided some other means is provided to isolate the optical fibers within the buffer tube from the deleterious diffusion of hydrogen. Illustratively, this might be achieved by forming the buffer tube itself from a material impervious to the diffusion of hydrogen.

An abrasion resistant outer jacket or sheath 24 formed, illustratively, from polyethylene encapsulates the cable assembly and, in the event an electrically conductive member as member 22 is provided, further serves as an insulating layer. The thickness of sheath 24 is a function of the desired degree of electrical insulation and resistance to abrasion or other damage during handling.

Having now described at length the structural elements of a cable assembly constructed in accordance with the present invention, the particular attributes of a thixotropic gel employed in accordance with the present invention will now be described in detail. Being thixotropic, the viscosity of the buffer tube filling gel decreases as the shear increases. An essential feature of the present invention is that the fragile optical fibers disposed with the buffer tube must be protected despite the application of the very large tensile loads associated with a worst-case cable recovery and repair operations. During such an operation, which might involve, for example, the replacement of a section of undersea cable damaged by the activities of a passing ship, a repair vessel having the necessary components (including a replacement section of cable) to be used in the repair must first be dispatched to the scene of the damage. Then, a remotely operated submersible device is deployed to the location of the damaged cable, the cable is cut, and each end is secured. Both ends of the cable are then pulled from their buried location in the ocean floor onto the repair vessel. During this retrieval process, the cable may be subjected to a tensile load of up to 12,000 pounds to 18,000 pound—depending on the cable type and depth.

To the degree water and other deleterious compounds found have penetrated each end of the cable, it is necessary to remove an amount of cable from each end sufficient to ensure no damaged fiber or cable remains. Then, a replacement section is inserted, using field splices that connect respective ends of each fiber and splice box assemblies that restrain the other terminating portions of the cable. The repaired section is then deployed and reburied under the ocean floor.

The inventors herein have recognized that in order to ensure that the service life of the cable (in particular, that of the optical fibers disposed therein) is not compromised, it is necessary to ensure that the thixotropic water blocking gel within the hollow buffer tube has a viscosity and critical yield shear stress sufficient to couple, upon application of the tensile loads characteristic of a cable repair operation, tensile forces from the buffer tube to the optical fibers to thereby induce strain in the fibers that is proportional to that induced in the tube, while also allowing said fibers to return to a substantially unstrained condition upon the removal of such tensile load. As used herein, the phrase substantially unstrained condition is intended to refer to an average residual strain in the fiber in the range of from about −0.05% to about 0.10%, the preferred value being as close as possible to zero or, if this is impractical, to the strain level at the original preloaded condition. Since the amount of residual strain may not be uniformly distributed along the fiber, however, the condition may alternatively be defined by reference to the increase in attenuation or average loss in the fiber that is attributable to the residual strain therein. For a typical undersea telecommunication system, such average change in attenuation is preferably substantially close to zero.

The above described functionality requires, in accordance with the teachings of the present invention, the balancing of several factors—including both the aforementioned properties of the thixotropic gel and the amount of excess fiber length in the cable. For example, if too much slack is provided in the optical fibers, they may not return to a substantially unstrained condition even after the tensile load is removed. The inventors herein submit that the expected tensile load to which a cable might be subjected during a repair event may be best characterized as a function of the amount of strain induced in such cable, this value being expected to approach but not exceed about 0.8% for the materials described herein in connection with the illustrative embodiment depicted in FIG. 1. Accordingly, a thixotropic water blocking gel having, at 25° C., a critical yield shear stress of from 0.003 to 0.010 psi and a Brookfield cone/plate (equilibrium) viscosity of between 20,000 and 40,000 centipoise is predicted to provide satisfactory results when the excess fiber length in the cable is below 0.1%. One commerically available thixotropic gel possessing the appropriate rheological properties for incorporation in a cable constructed in accordance with the present invention is Master Gel 1795, which is manufactured by Master Adhesives Inc. of Norcross, Ga. As will be readily appreciated by those skilled in the art, the characterization of properties at 25° C. is made for purpose of convenient reference only, it being understood that the aforementioned properties of viscosity and critical yield shear stress will vary predictably in dependence upon the ambient temperature in which the cable is deployed.

Figure 2:
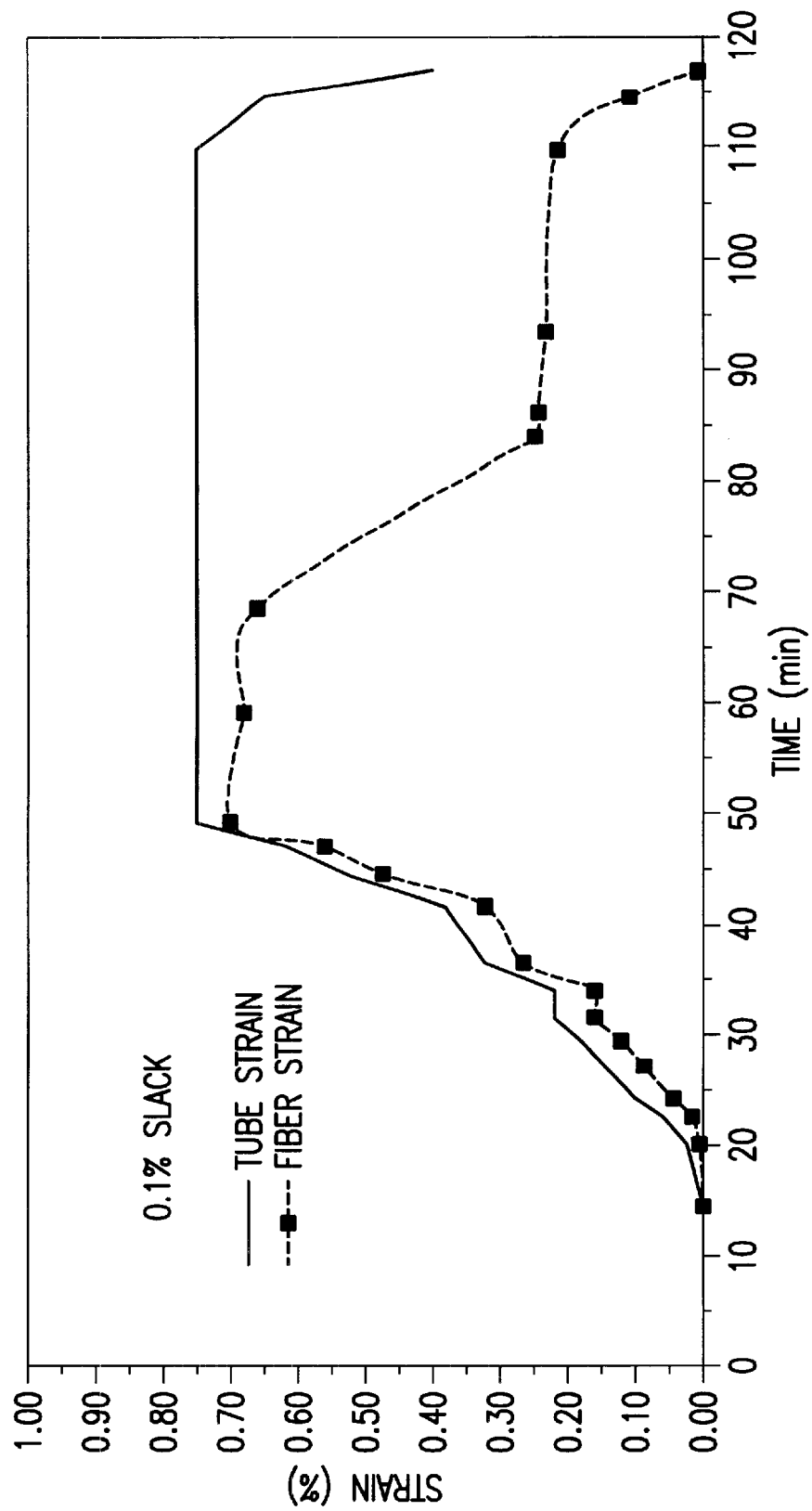
FIGS. 2 and 3 are graphical representations illustrating the degree to which a tensile force applied to the cable is coupled to the optical fiber when the rheological properties of the sealing gel are selected in accordance with the principles of the invention, as well as the effect of excess fiber length (slack) on the strain behavior of the fibers when such a tensile force is applied and then removed.
Figure 3:
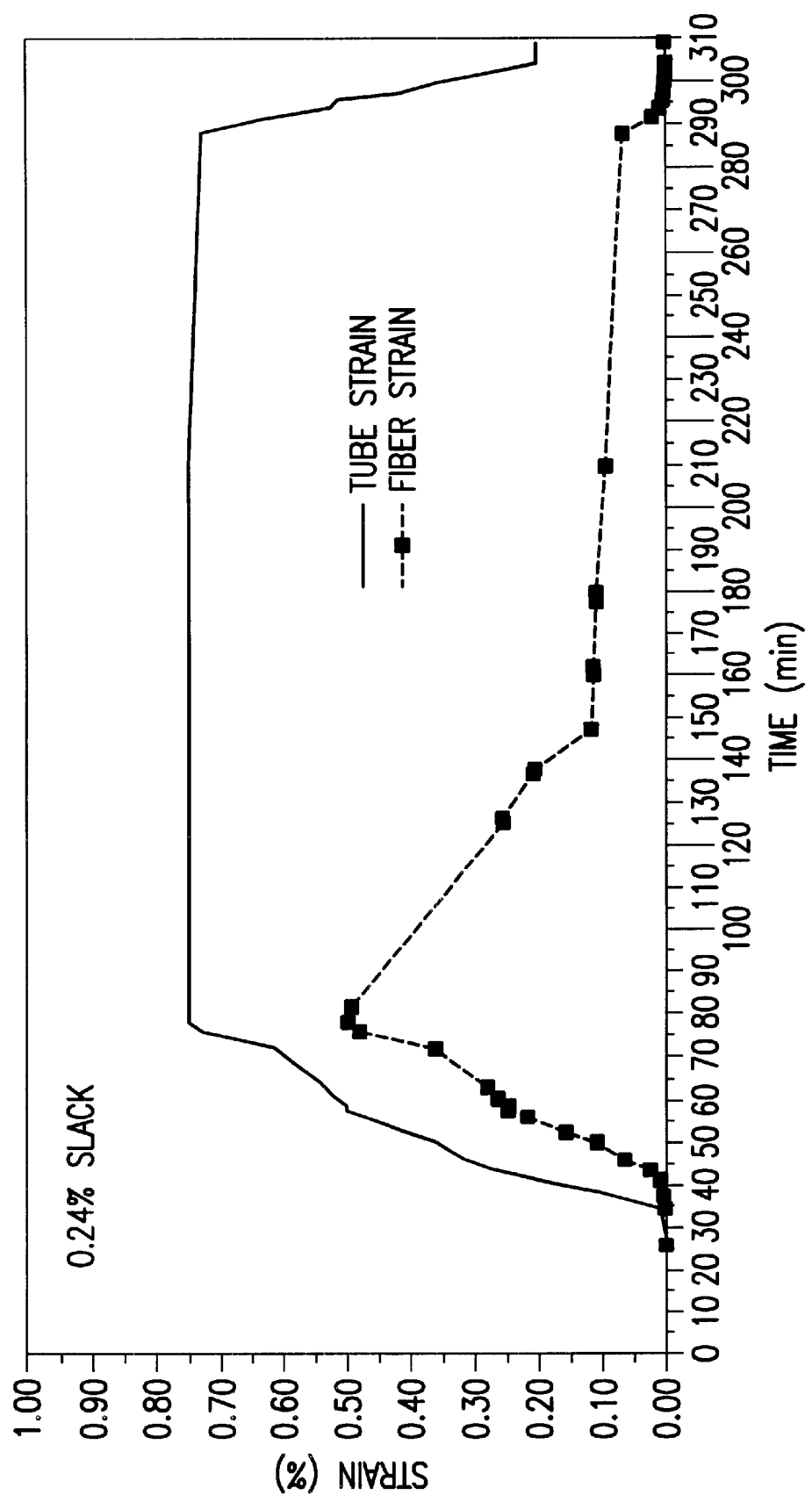

With reference to FIGS. 2 and 3, the degree to which a tensile force applied to the cable is coupled to the optical fiber when the theological properties of the sealing gel are selected in accordance with the principles of the invention, as well as the effect of excess fiber length (slack) on the strain behavior of the fibers when such a tensile force is applied and then removed, may be better understood. FIGS. 2 and 3 contrast the ability of an optical fiber having an excess fiber length of 0.1% and one having an excess fiber length of 0.24% to return to a substantially unstrained condition after the buffer tube is subjected to a tensile load that is equivalent to that which would induce stresses approaching 0.8% in the cable. It will be seen that in each case the coupling provided by the gel is such that the load applied to the buffer tube is very closely proportional to that applied to the fibers. In the case of the shorter fiber length (FIG. 2), the return to a substantially unstrained condition is substantially faster and more complete. The significance of this difference in strain relief behavior will be better appreciated by comparing FIGS. 4A and 4B.

Figure 4A:
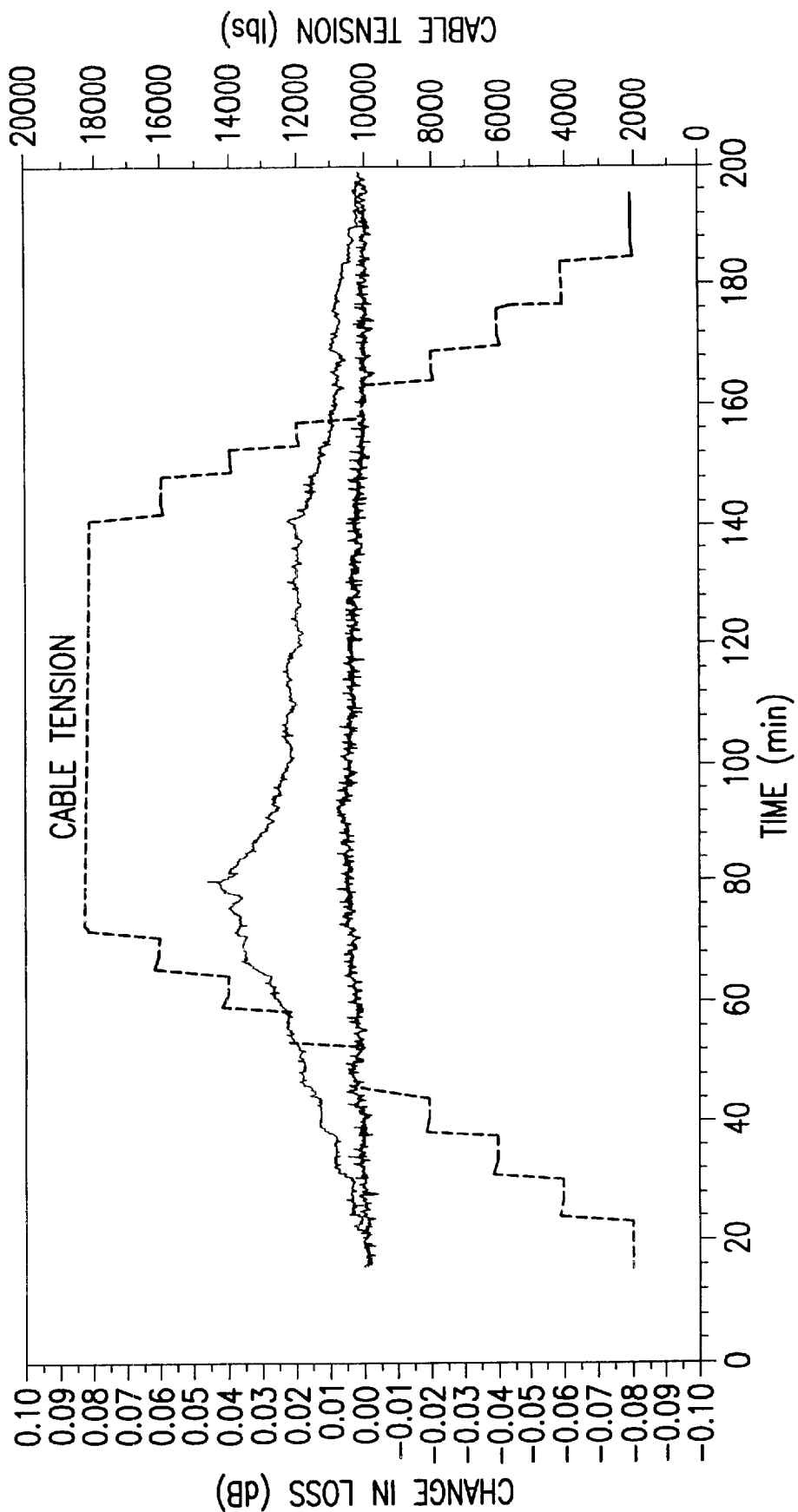
FIG. 4A is a graphical representation depicting the change in attenuation to which the fibers of a cable constructed in accordance with the present invention are subjected before, during, and after a typical cable retrieval and repair operation.
Figure 4B:
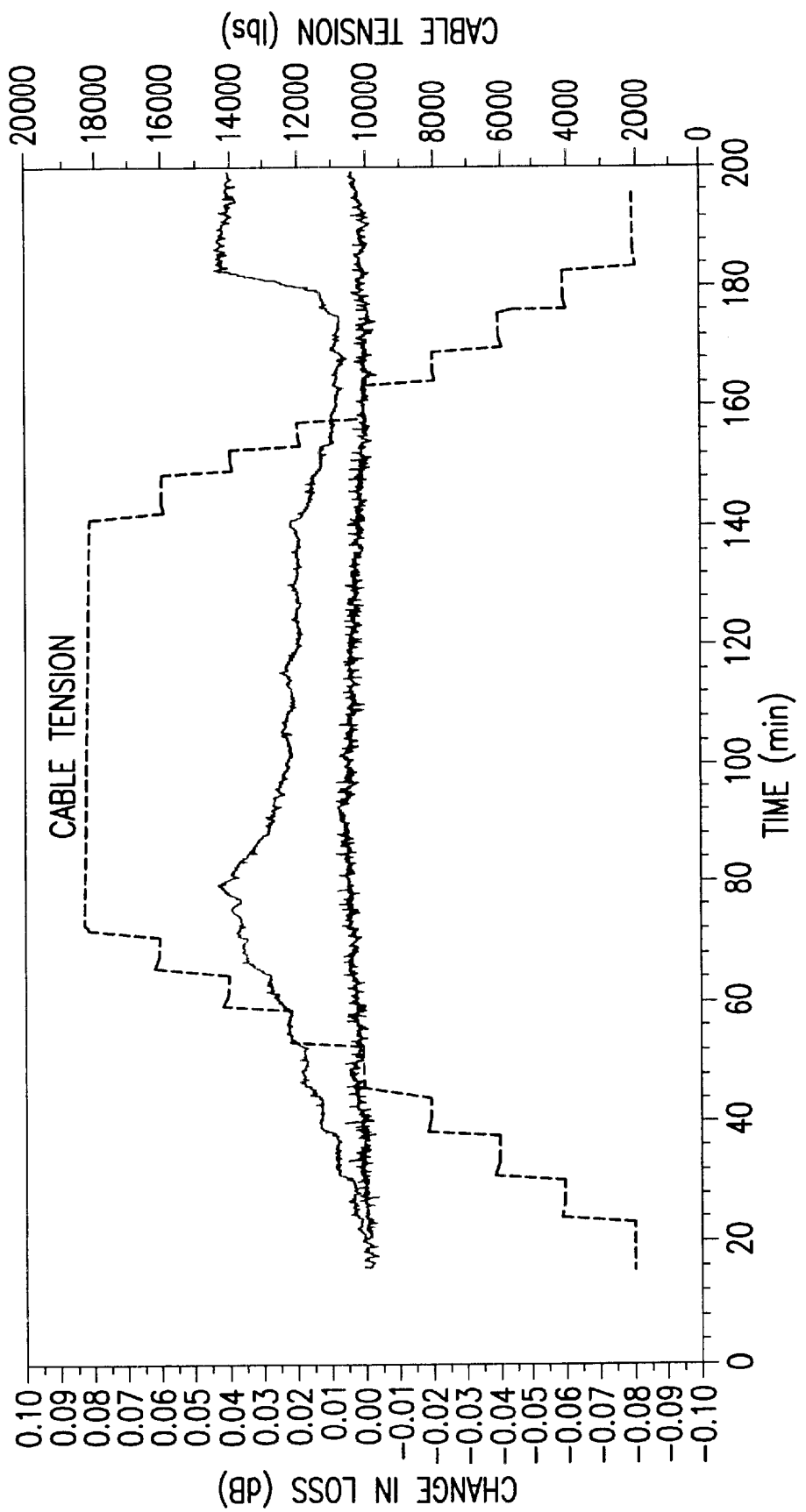
FIG. 4B is a graphical representation depicting the attenuation change behavior of a cable constructed in all respects identical to that evaluated in FIG. 4A, except for an increase in the amount of excess fiber length so as to demonstrate the influence that criteria may have on fiber transmission performance.

FIG. 4A is a graphical representation depicting the change in attenuation to which the fibers of a cable constructed in accordance with the present invention are subjected before, during, and after a typical cable retrieval and repair operation. By reference to FIG. 4A, it will be seen that with selection of a gel in accordance with the teachings of the present invention and an appropriate amount of excess fiber length, 0.1% in the specimen under evaluation in FIG. 4A, the average increase in attenuation to the optical signals traversing the fiber that is attributable to residual stress therein (following the application and release of a tensile load to the cable as in a repair operation), is about zero (0) dB/km. Although an identical gel formulation was employed in FIG. 4B, however, it will be seen that when the larger amount of excess fiber length is selected, 0.24% in the illustrative example, the increase in attenuation does not return substantially to zero but rather levels out at around 0.02 dB/km. This is believed by the inventors herein to be attributable to a decreased tendency of the fiber, as the excess length is increased, to recover its original shape and relative position within the tube.

Figure 5:
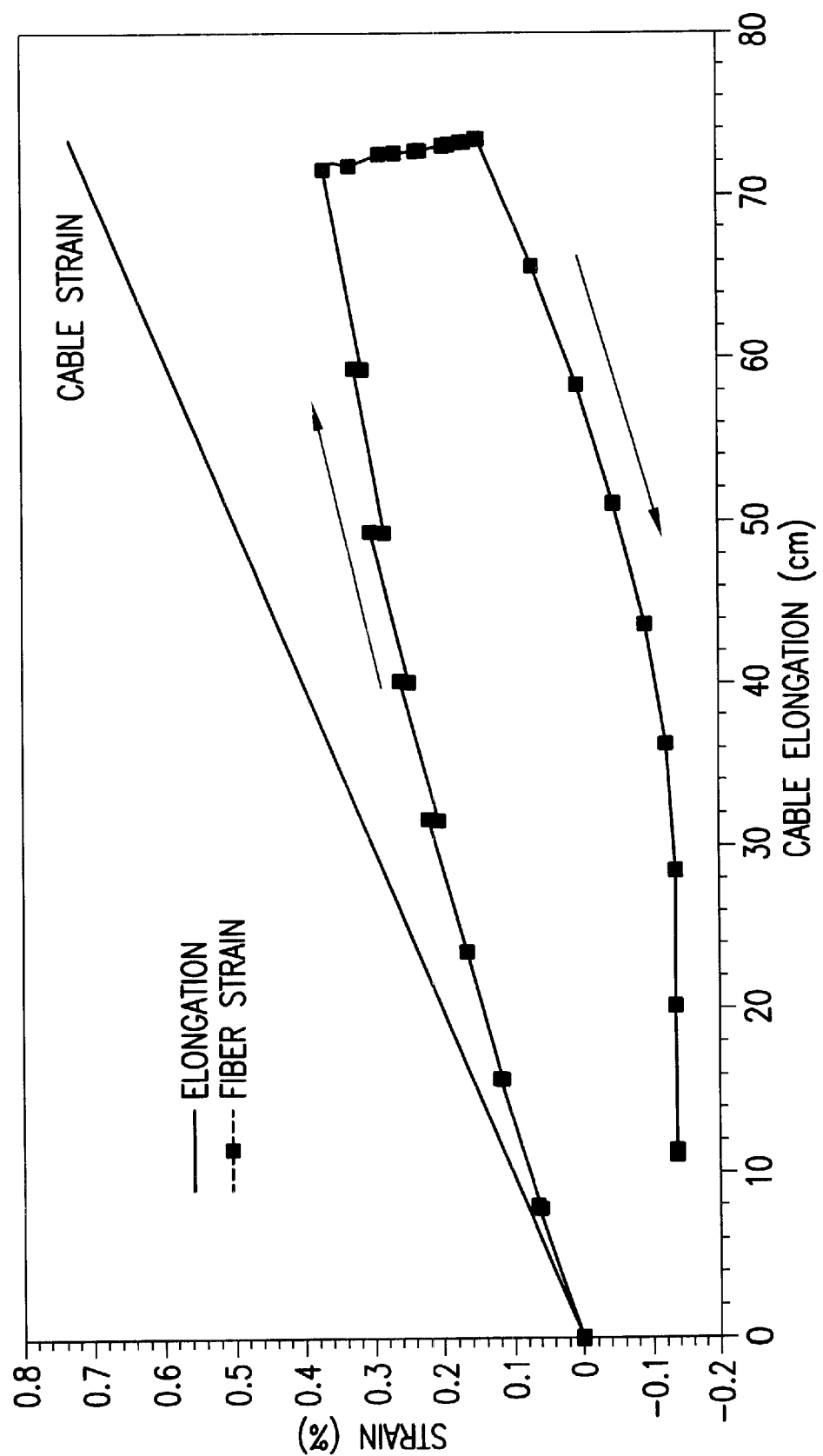
FIGS. 5 is a graphical representations depicting the strain behavior of fiber and cable when a gel formulation is selected without regard to the principles of the present invention.
Figure 6:
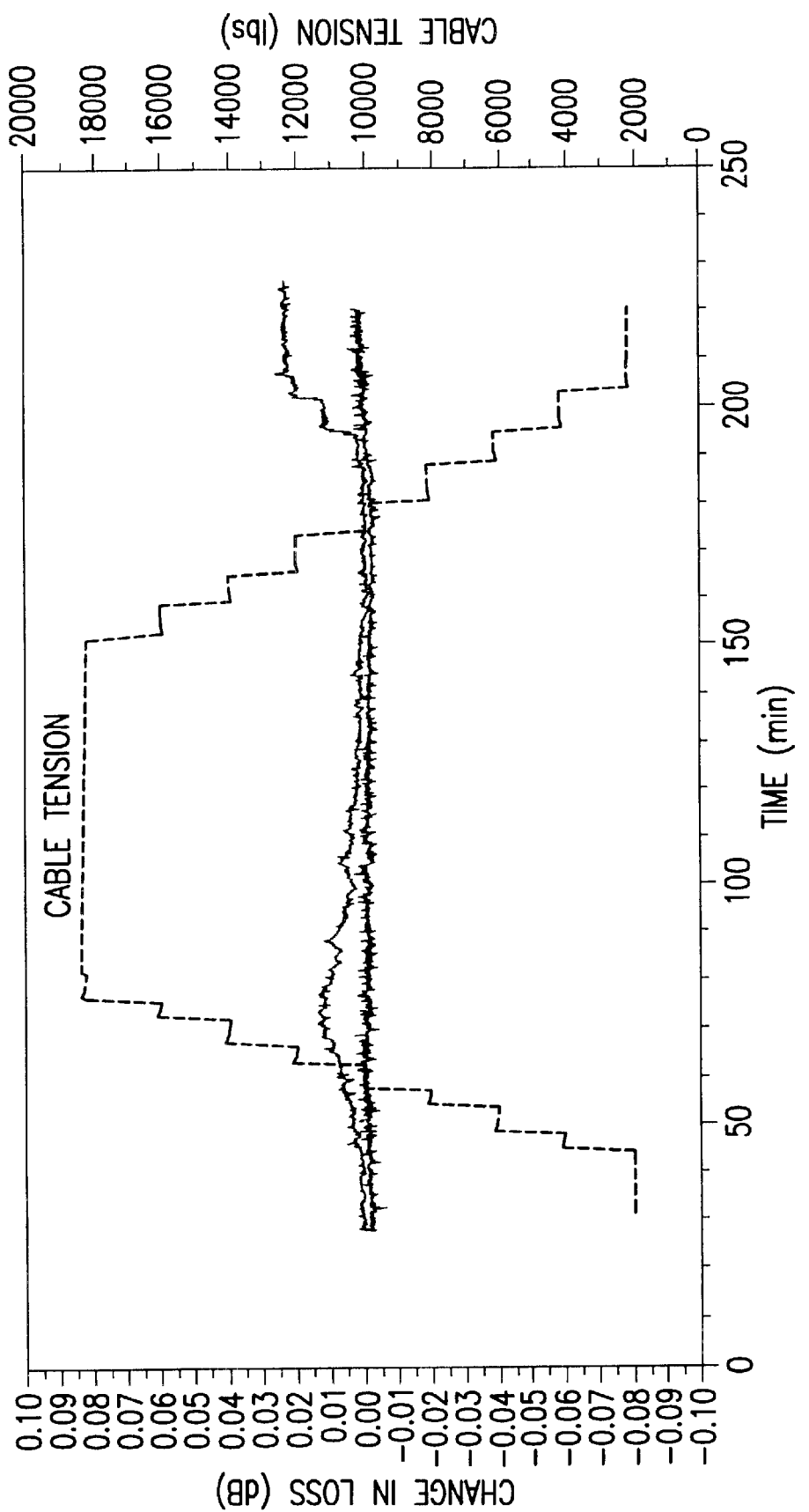
FIG. 6 is graphical representation depicting the unacceptable rise in attenuation associated with the use of the gel formulation employed in the cable sample under evaluation in FIG. 5.

FIGS. 5 and 6 depict the strain behavior of fiber and cable when the thixotropic gel formulations are selected without regard to the principles of the present invention, as well as the effect such a selection may have, in the event a sufficient tensile load is applied to the cable, on the attenuation loss induced in the fiber. It is important to recognize that the use of thixotropic gels, within the buffer tubes of undersea telecommunications cables, has heretofore been made without regard to the specific influence of the rheological properties of the gel, i.e. the viscosity and critical yield shear stress on the ability of the fiber to return to a substantially unstrained condition, nor of the additional impact of any excess fiber length on such influence. FIG. 5 demonstrates, for a particular commercially available gel that has been used in the buffer tube of a conventional undersea cable, that when these properties are not properly balanced, residual strains may remain on the fibers long after the tensile load has been removed, leading to unacceptable levels of attenuation (FIG. 6). As noted earlier, if the viscosity and critical yield shear stress is not sufficiently high, the coupling between the fiber and the buffer tube will be insufficient for the cable to respond to loading on the cable. If, on the other hand, these values are too high, the fiber will be unable to return to a substantially unstrained condition. In light of the foregoing description, it will be readily appreciated by those skilled in the art that the teachings of the present invention may be applied to substantially enhance the reliability and performance of optical fiber cables designed specifically for undersea use. Although there have been described herein certain non-limiting examples only, many variations and modifications are believed to be within the scope of the present invention as defined by the appended claims.

What is claimed is:

1. An undersea telecommunications cable having a plurality of optical fibers comprising:
   a buffer tube defining an interior bore dimensioned and arranged to receive and protect said plurality of optical fibers from externally applied forces, said buffer tube further containing a thixotropic, water blocking gel having, at 25° C., a critical yield shear stress of from 0.003 to 0.010 psi and a cone/plate viscosity of between 20,000 and 40,000 centipoise;
   a series of strength members arranged in at least one layer around the buffer tube to withstand hydrostatic forces and traction on said cable during deployment and recovery; and
   a plastic jacket surrounding said buffer tube and strength members, wherein said gel is adapted to loosely couple a tensile load applied to the buffer tube to said optical fibers while allowing said fibers to return to a substantially unstrained condition upon the removal of such tensile load.

2. The undersea telecommunications cable of claim 1, wherein said optical fibers have an average excess fiber length of from 0 to 0.1%.

3. The undersea telecommunications cable of claim 2, wherein said optical fibers have an average excess fiber length of from 0 to 0.05%.

4. The undersea telecommunications cable of claim 1, wherein the buffer tube is formed from one of polybutylene terephthalate and polycarbonate.

5. The undersea telecommunications cable of claim 1, wherein said strength members are arranged in at least two concentric layers in a close fitting relationship.

6. The undersea telecommunications cable of claim 1, wherein said water blocking gel has a fill ratio of at least 87%.

7. The undersea telecommunications cable of claim 1, wherein said water blocking gel is a synthetic oil having particles of fumed silica-colloidally dispersed therein.

8. The undersea telecommunications cable of claim 1, further including an electrical conductor concentrically disposed between said series of strength members and said plastic jacket.

9. The undersea telecommunications cable of claim 1, wherein said series of strength members comprises a layer of steel wires helically wound about an exterior surface of said buffer tube.

10. An undersea telecommunications cable having a plurality of optical fibers comprising:
    a buffer tube defining an interior bore dimensioned and arranged to receive and protect said plurality of optical fibers from externally applied forces, said buffer tube further containing a thixotropic, water blocking gel adapted to resist the ingress of water in the event of damage to said cable;
    a series of strength members arranged around the buffer tube;
    an electrical conductor concentrically dispose around said series of strength members; and
    a plastic jacket surrounding said buffer tube, strength members, and electrical conductors, wherein said gel has a viscosity and critical yield shear stress sufficient to couple, upon application of a tensile load to the cable producing up to a 0.8% cable strain, tensile forces to said optical fibers to thereby induce strain in the fibers proportional to that induced in the tube, while also allowing said fibers to return to a substantially unstrained condition upon the removal of such tensile load.

11. The undersea telecommunications cable of claim 10, wherein said gel has a critical yield shear stress in the range of from 0.003 psi to 0.01 psi.

12. The undersea telecommunications cable of claim 10, wherein said gel has a fill ratio of at least 87%.

13. The undersea telecommunications cable of claim 10, wherein said optical fibers have an average excess fiber length of from 0 to 0.1%.

14. The undersea telecommunications cable of claim 13, wherein said optical fibers have an average excess fiber length of from 0 to 0.05%.

15. The undersea telecommunications cable of claim 14, wherein the buffer tube is formed from one of polybutylene terephthalate and polycarbonate, and wherein the gel has a critical yield shear stress of from 0.003 psi to 0.010 psi.

16. The undersea telecommunications cable of claim 10, wherein said strength members are arranged in at least two concentric layers in a close fitting relationship.

17. An undersea telecommunications cable having a plurality of optical fibers comprising:

a hollow buffer tube having disposed therein said plurality of optical fibers and a thixotropic gel; and a strengthening assembly concentrically disposed around said hollow buffer tube;

wherein said thixotropic gel has a viscosity and critical yield shear stress sufficient to couple, upon application of a tensile load to the cable producing up to a cable strain of up to 0.8%, tensile forces to said optical fibers to thereby induce strain in the fibers substantially proportional to that induced in the tube, while also allowing said fibers to return to a substantially unstrained condition upon the removal of such tensile load.

18. The undersea telecommunications cable of claim 17, wherein the average excess fiber length in the cable is less than 0.1%, wherein the viscosity of said thixotropic gel is less than around 32,000 centipoise at 25° C., and wherein the critical yield shear stress is between from 0.003 to 0.010 psi.

19. The undersea telecommunications cable of claim 18, wherein the hollow buffer tube is comprised of polybutylene terephthalate and wherein the gel comprises a synthetic oil having particles of fumed silica colloidally suspended therein, said gel having a fill ratio by volume of at least 87%.

20. The undersea telecommunications cable of claim 17, wherein the viscosity and critical yield shear stress of said thixotropic gel are such that forces coupled between said buffer tube and said optical fibers are insufficient to cause any substantial increase in the attenuation of signals traversing said optical fibers, after said tensile load is released.

* * * * *